United States Patent
Rustige et al.

(10) Patent No.: US 6,939,265 B2
(45) Date of Patent: Sep. 6, 2005

(54) METHOD OF CONTROLLING A MOTOR VEHICLE WITH AN AUTOMATED CLUTCH DEVICE

(75) Inventors: Carsten Rustige, Buhl (DE); Klaus Küpper, Buhl (DE); Martin Zimmermann, Sasbach (DE); Martin Vornehm, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/719,658

(22) Filed: Nov. 20, 2003

(65) Prior Publication Data

US 2004/0138027 A1 Jul. 15, 2004

Related U.S. Application Data

(63) Continuation of application No. PCT/DE02/01759, filed on May 16, 2002.

(30) Foreign Application Priority Data

May 21, 2001 (DE) .......................... 101 24 605
May 21, 2001 (DE) .......................... 101 24 606

(51) Int. Cl.⁷ .............................. B60K 41/02
(52) U.S. Cl. .................... 477/84; 477/91; 477/175; 477/181
(58) Field of Search .................. 477/77, 80, 83, 477/84, 90, 91, 175, 181

(56) References Cited

U.S. PATENT DOCUMENTS

| | | | |
|---|---|---|---|
| 4,509,628 A | 4/1985 | Junginger et al. | |
| 4,621,545 A | 11/1986 | Mohl | |
| 4,842,113 A | 6/1989 | Lutz | |
| 4,971,183 A | * 11/1990 | Tellert | 477/86 |
| 5,012,418 A | 4/1991 | Petzold | |
| 5,024,305 A | * 6/1991 | Kurihara et al. | 477/175 |
| 6,102,831 A | * 8/2000 | Wakahara et al. | 477/169 |

FOREIGN PATENT DOCUMENTS

| | | |
|---|---|---|
| DE | 31 51 087 A1 | 7/1983 |
| DE | 40 11 850 A1 | 10/1990 |
| DE | 44 19 633 A1 | 12/1994 |
| DE | 44 26 260 A1 | 2/1995 |
| DE | 195 07 622 A1 | 9/1995 |
| DE | 197 07 140 C1 | 5/1998 |
| DE | 199 20 065 A1 | 12/2000 |
| EP | 0242127 | * 10/1987 |
| WO | WO-97/10456 A2 | 3/1997 |

* cited by examiner

*Primary Examiner*—Ha Ho
(74) *Attorney, Agent, or Firm*—Darby & Darby

(57) ABSTRACT

A method of controlling a motor vehicle with an automated clutch is provided and includes the steps of: (a) detecting the vehicle speed, (b) detecting if the brake and/or the gas pedal is actuated, (c) detecting whether or not the engine is running, (d) disengaging the clutch if the engine is found to be running while the vehicle is found to be moving faster than a threshold speed, and if at the same time neither the brake nor the gas pedal is found to be actuated, and (e) subsequently re-engaging the clutch if the brake and/or gas pedal is found to be actuated. Prior to re-engaging the clutch, a transmission input rpm-rate is determined, and an engine rpm-rate is controlled in such a manner that that the respective rpm-rates of the engine and the transmission are brought towards a closer agreement.

23 Claims, 4 Drawing Sheets

METHOD OF CONTROLLING A MOTOR VEHICLE WITH AN AUTOMATED CLUTCH DEVICE

CROSS-REFERENCES TO RELATED APPLICATIONS

This application is a Continuation of International Patent Application Serial No. PCT/DE02/01759, filed May 16, 2002, published in German, which claims priority of German patent applications DE 101 24 606.4 and DE 101 24 605.6, both filed May 21, 2002, and which is hereby incorporated by reference in its entirety.

BACKGROUND OF THE INVENTION

The invention relates to a method of controlling a motor vehicle that is equipped with an automated clutch device, with an engine that is actuated by an engine control device, preferably with an actuator-controlled automated transmission, and with at least one electronic control device that controls the actuation of the transmission and the clutch device. The method includes detecting a quantity that is at least representative of a traveling speed of the vehicle, detecting an actuation of a brake and/or of an energy- or fuel-metering element, and detecting a condition of the engine. In a case where neither the brake pedal nor the fuel-metering element is found to be actuated while the engine is running and the vehicle speed exceeds a given limit value, the clutch is taken out of engagement.

A transmission or a transmission device, as the term is used herein, is a mechanism that can be shifted or set to different shift positions or ratio positions, either in steps or in a stepless range, where the transmission produces different transmission ratios between two rotary shafts. The transmission device can be configured as a stepwise shifting transmission or as a steplessly settable transmission, such as for example a cone-pulley transmission or the like. Shift processes of the transmission device between different ratio steps can be performed automatically or manually or in a partially automated way, or automated with the added optional possibility for manual intervention. In the shift from one shift position to another shift position, there can be an interruption in vehicle traction, or the transmission may also be of a kind that works with no interruption in vehicle traction.

The term "automated shift transmission" as used in the context of the present invention means in particular a transmission device in which the shift processes can be actuated in an automated manner where there is an interruption in vehicle traction. The automated shift transmission has for example at least one controllable electric motor or a hydraulic device for the actuation of shift processes.

A gear level or shift level in the sense of the present invention means a shift position in which a given transmission ratio is set. Furthermore, the term transmission ratio may be used synonymously with gear level in the sense that a steplessly settable transmission may be used instead of a transmission with discrete ratio steps.

Methods and devices of the kinds that have just been referred to belong to the known state of the art and are used in motor vehicles with automated shift transmissions that can be equipped with a so-called free-running function. The term free-running refers to a condition where the clutch is disengaged while the vehicle is coasting, where neither the gas pedal as fuel metering element nor the brake pedal is used. Essentially, the purpose of the free-running function is to save fuel. In this operating state, the vehicle is traveling or rolling, i.e., the vehicle speed is greater than zero, while the engine rpm-rate is about equal or exactly equal to the idling rpm-rate, or the engine may even be switched off. To enter the free-running mode (also referred to herein as free-running function), the clutch is moved out of engagement under the control of the electronic control unit while the transmission remains in gear, so that the vehicle does not lose kinetic energy as a result of the braking effect of the engine. The free-running mode is usually terminated by applying a brake and/or the gas pedal.

In the context of electronic control and regulating. devices with associated sensors and actuating means as well as methods for the control and regulation of motor vehicles with automated shift transmissions, reference is made to DE 40 11 850 A1, DE 44 26 260 A1, and DE 195 07 622 A1.

The free-running function of the foregoing description has the drawback that when the free-running mode is ended, the re-engagement of the clutch cannot always be performed in a jolt-free, quick and comfortable manner.

Automated clutch systems with a hydraulic actuating means for the clutch, as well as control methods relating to such systems, are disclosed in particular in DE 44 26 260 A1. Furthermore, a hydraulically operated automated transmission with an automated clutch is disclosed in WO 97/10456. In DE 44 26 260, an actuating means is disclosed with a piston that is movable in a cylinder by hydraulic action. The cylinder has an opening, the so-called snifting bore that serves to equalize the pressure and volume of the hydraulic fluid when the piston is in a position where the snifting bore is open. In this position of the piston, the fluid volume in the cylinder communicates through a hydraulic conduit with a fluid volume in a reservoir container so that a volume adjustment can take place. However, the piston can take this position only when the clutch is engaged, i.e., in the non-actuated position. The invention is further related to DE 44 26 260, whose content is hereby expressly incorporated herein by reference.

It is a further disadvantage that the pressure- and volume adjustment—since it requires the clutch to be in the engaged condition—cannot be performed during the free-running mode, because the control unit takes the clutch out of engagement during the free-running mode.

OBJECT OF THE INVENTION

In view of the current state of the art as described above, the invention has the objective to perform the re-engagement of the clutch at the end of a free-running phase in a quick and substantially jolt-free manner.

As a further objective, the invention aims to improve the aforementioned method and also to improve a device that serves to perform the method, so that a pressure- or volume equalization, i.e., a snifting process, can also take place when the vehicle is in free-running mode.

SUMMARY OF THE INVENTION

According to the invention, the free-running function is terminated in the manner described above, i.e., through an arrangement where the clutch is caused to engage when a brake is applied and/or the fuel-metering element is actuated, wherein the invention adds the concept that prior to the engagement of the clutch the rpm-rate of the transmission input shaft, or a quantity that is representative of the rpm-rate of the transmission input shaft, is detected and the engine rpm-rate is controlled in such a manner that the two rpm-rates are made equal to each other or brought into closer agreement.

It serves the purpose of the invention if the engine rpm-rate is brought into closer agreement with the rpm-rate of the transmission input shaft by providing a target rpm-rate to the engine control device.

It also serves the purpose of the invention if a control system provides the target rpm-rate to the engine control device and the latter brings the engine rpm-rate into closer agreement with the target rpm-rate by controlling the fuel flow rate to the engine, or by controlling the throttle valve position, the ignition timing, the ignition angle, the opening and closing of the engine valves, or if the equalization is effected by the engine control device in some other way.

It is practical to bring the engine rpm-rate into agreement with the rpm-rate of the transmission input shaft by controlling the engine torque.

It is advantageous to use a strategy where the control system sets a torque target for the engine control device and the latter adjusts the engine torque to the torque target, where the torque target is varied as a function of time in such a manner that the engine rpm-rate approaches equality with the rpm-rate of the transmission input shaft.

It is further consistent with the purpose of the invention if the clutch is moved into engagement after the engine rpm-rate has been equalized to the rpm-rate of the input shaft. According to a further concept of the invention, it is advantageous to begin the clutch engagement after the engine rpm-rate has been equalized to the rpm-rate of the transmission input shaft. In connection with the latter concept, it can be advantageous to engage the clutch at the maximum speed of engagement. In a further embodiment, it is advantageous to engage the clutch at a slower rate of engagement than the maximum speed of engagement.

It is consistent with the purpose of the invention if an rpm-difference between the engine rpm-rate and the rpm-rate of the input shaft within about 5% or 50 rpm is considered as a state of agreement or equality between the rpm-rates.

It is particularly advantageous if an rpm-difference is dependent, e.g., on a rate of change of the engine rpm-rate (also referred to as time gradient of the engine-rpm-rate). This means that the limit for the rpm-difference can vary dependent on what boundary conditions are present.

In another embodiment, a state of agreement is considered to be attained only after the engine rpm-rate matches or exceeds the rpm-rate of the transmission input shaft.

It is particularly advantageous in the case where the inventive method is practiced by controlling the engine torque, if the engine torque is lowered after the clutch has been engaged by reducing the supply rate of energy or fuel to the engine.

It can further be practical if following the actuation of a brake, the clutch engagement occurs already prior to reaching the equality of rpm-rates.

It is further practical if following the actuation of the fuel-metering element, the clutch engagement occurs only when or after the equality of rpm-rates is attained.

A further concept of the invention, relates likewise to a method of controlling a motor vehicle with an automated clutch device, with an engine that is controlled by an engine control device, preferably with an actuator-controlled automated transmission, with at least one electronic control system for controlling the transmission and the clutch device, where the method includes detecting a quantity that is at least representative of a vehicle speed, detecting when a brake is being applied, and/or detecting the actuation of an energy- or fuel-metering element and a condition of the engine, and where the clutch is taken out of engagement if neither the brake pedal nor the fuel-metering element are found to be actuated while the engine is running and the vehicle is moving faster than a threshold value. In the method with the foregoing steps, it is advantageous according to the further concept of the invention if the re-engagement of the clutch is initiated immediately upon detecting a brake actuation. This produces an engine brake effect. The re-engagement of the clutch is preferably controlled in a manner that the driver will find less irritating, but where the re-engagement process is nevertheless performed quickly.

To practice the method according to the invention, the vehicle needs to be equipped with a programmable electronic control system with inputs that can be connected to detecting means for the rpm-rates of the engine and the shift transmission and for the positions of the actuating elements such as the pedals that belong to the brake and to an energy- or fuel-metering element. Through the outputs of the control system, control signals are sent to an actuator that is powered, e.g., by an electrically controlled motor and to the electrically controlled clutch device. The circuit and programming of the control system need to be designed appropriately to allow the steps of the method to be performed.

With a so-called torque control intervention into the engine control, it is possible to approximately adjust or precisely equalize the engine rpm-rate to the transmission rpm-rate or, more specifically, to the rpm-rate of the transmission input shaft. The torque control intervention is performed in such a manner that the control system of the automated clutch or the automated transmission or steplessly settable transmission dictates an engine torque target to the engine control device, whereupon the engine control device will attempt to adjust the engine torque to the torque target by modifying the fuel injection rate, the throttle valve position, or through a similar measure. The torque control intervention which originates from the control system of the clutch and/or transmission has the aim of attaining a targeted engine rpm-rate through a dynamic variation of the engine torque target.

It is advantageous to adjust the engine rpm-rate as closely as possible. If the transmission rpm-rate is matched with high precision, the clutch can ideally be engaged at the maximum engagement speed without a loss of driving comfort. A precise match in the context of the invention means that the engine rpm-rate deviates by less than 5% from the transmission rpm-rate, while a high-precision match is defined by a deviation of less than 2%. An approximate match is defined as a deviation by no more than 10% of the transmission rpm-rate. The method also has advantages for the driver as it provides a very quick feedback about the current operating condition, for example whether the engine brake is active or the vehicle is operating with engine traction.

Thus, the exit from the free-running function can be performed in a manner that is almost unnoticeable to the driver. After the clutch has been re-engaged, the indicated torque at which the torque control intervention was performed is cut back in an appropriate manner by reducing the energy- or fuel supply to the engine.

Instead of a torque control intervention, it is also advantageous to use a direct rpm-intervention, provided the engine control is programmed accordingly. The advantage of this solution lies in an even more precise matching of the engine rpm-rate to the transmission rpm-rate than is possible with the torque control intervention.

Further in accordance with the invention, it is proposed to practice a method of the kind presented at the beginning, but adding the step of shifting the transmission into the neutral position N while the clutch is out of engagement, and then allowing an adjustment of fluid volumes in the hydraulic circuit to take place.

To put the method according to the invention into practice, the vehicle needs to be provided with a programmable electronic control system which has inputs that can be connected to means for detecting the rpm-rate of an engine as well as the positions of a brake or brake pedal and an energy- or fuel-metering element, and for detecting which gear level of the transmission is currently engaged. The control system further has outputs through which control signals are sent to the electric actuator of the clutch device and to an electrically actuated transmission. The circuit arrangement and program of the control system need to be designed appropriately for performing the steps of the inventive method.

The equalization of hydraulic pressure and volume is performed after the transmission has been shifted into the neutral position. The previously engaged gear ratio is stored in a memory of the control system, so that the same gear ratio can be re-engaged in the transmission after the volume equalization has been completed. In a preferred embodiment, the time period starting with the shift into neutral and ending with the beginning of the volume equalization can be adjustable. The entire time period during which the clutch is in the engaged condition can likewise be adjustable. It is further preferred to disengage the clutch again after the end of the volume equalization and to shift the transmission into the gear ratio that was engaged prior to the shift into neutral. This can be realized by storing in memory which gear level was engaged before shifting into neutral. The volume equalization can be performed dependent on the previously engaged gear ratio. This minimizes the effect on the synchronization which the driver experiences when shifting into a gear after the volume equalization. As a result, the shift can be performed with a reduced synchronizing force.

BRIEF DESCRIPTION OF THE DRAWINGS

The invention is further explained below with reference to the embodiments that are illustrated in the drawings, wherein.

DETAILED DESCRIPTION OF PREFERRED EMBODIMENTS

Figure 1:
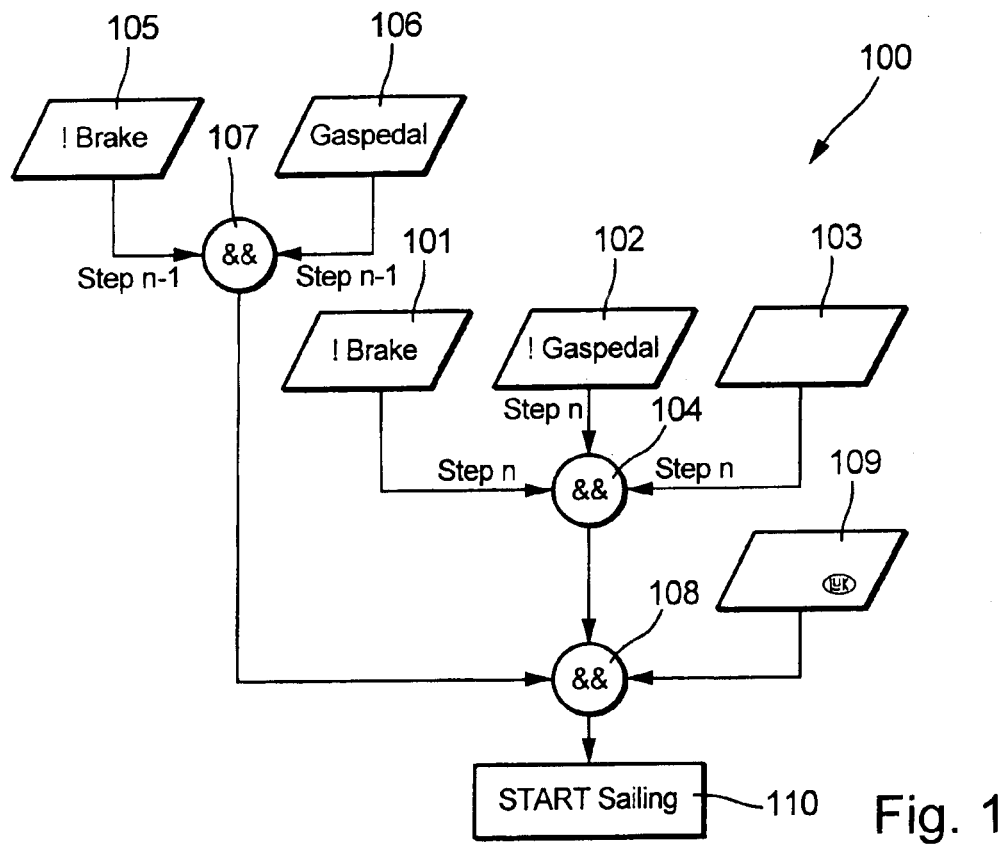
FIG. 1 represents a flowchart diagram for the initiation of a free-running phase.

The flowchart diagram of FIG. 1 serves to explain the initiation of a free-running phase. Block 1 represents an interrogation as to whether the brakes are in a non-actuated state. Block 102 represents an interrogation as to whether the gas pedal is in a non-actuated state. Block 103 represents an optional further interrogation relative to the presence or absence of at least one further condition. The outcomes of all of the three blocks are tied together through a logic AND-function in block 104 during the program cycle n. A free-running phase can be initiated only if all of the conditions in 101 to 103 are affirmative. Block 105 represents an interrogation whether the brake was in a non-actuated state in the program cycle n−1, i.e. in the preceding interrupt cycle of the control routine. Block 106 represents an interrogation whether the gas pedal was in an actuated condition. The results of 105 and 106 are tied together in the logic AND-function of block 107. If the logic block 108 receives affirmative signals from 107 and 108 and from an optional further block 109, the free-running process is initiated at step 110.

Figure 2:
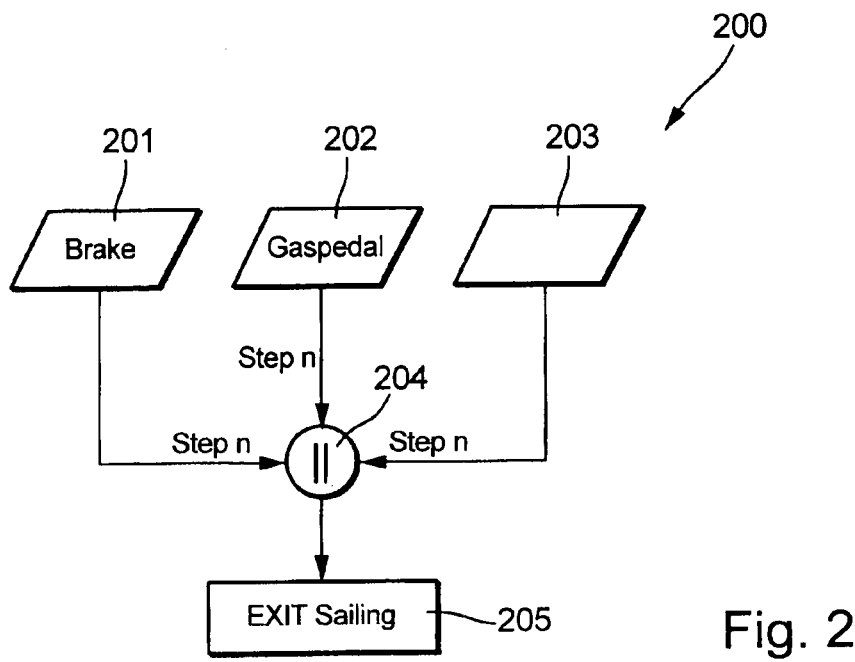
FIG. 2 represents a flowchart diagram for the exit from the free-running phase.
Figure 3:
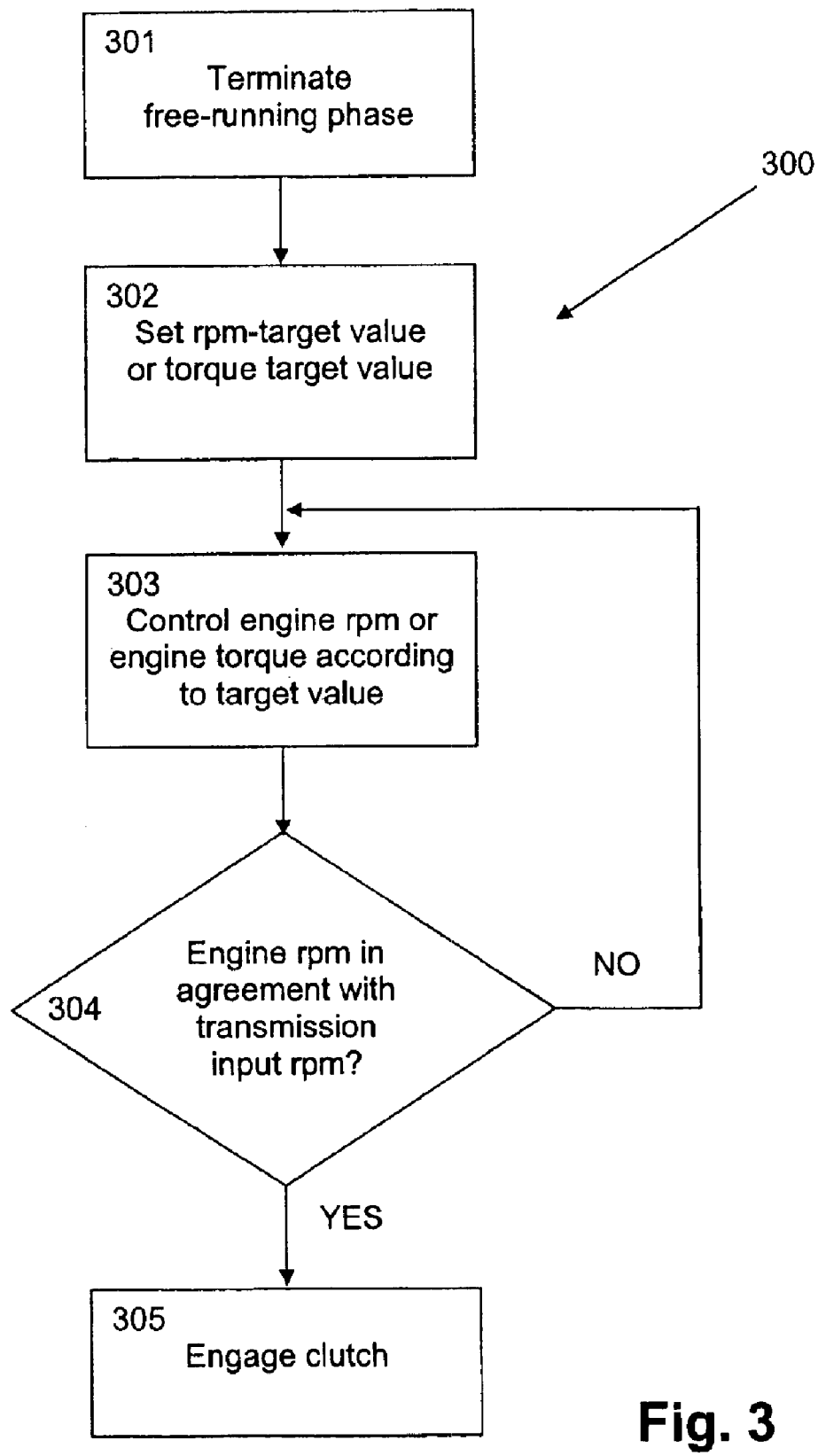
FIG. 3 represents a flowchart diagram.

The flowchart diagram of FIG. 2 illustrates the procedure for ending the free-running phase. Block 201 represents a test whether a brake, preferably the service brake, is in an applied state. Block 201 represents a test whether the gas pedal which controls the metering of the fuel supply to the engine is in an actuated condition. The presence or absence of additional conditions may be tested in an optional block 203. The outcomes of the blocks 201 to 203 are tied together in the logic OR block 204. If the outcome of at least one of the blocks 201 to 203 is affirmative, the free-running phase is terminated in block 205.

Figure represents a flowchart diagram 300 in accordance with the invention, beginning with block 301 where the free-running phase is terminated. This can occur, e.g., if the brake or gas pedal is actuated. In block 302, a target value is set either for the engine rpm-rate or the engine torque. In block 302, the combustion engine is regulated towards the targeted engine rpm-rate.

Block 304 represents a test whether the rpm-rates of the engine and the transmission are equal. If this condition is met within given tolerance limits, the program proceeds to block 305 where the re-engagement of the clutch is initiated.

Figure 4:
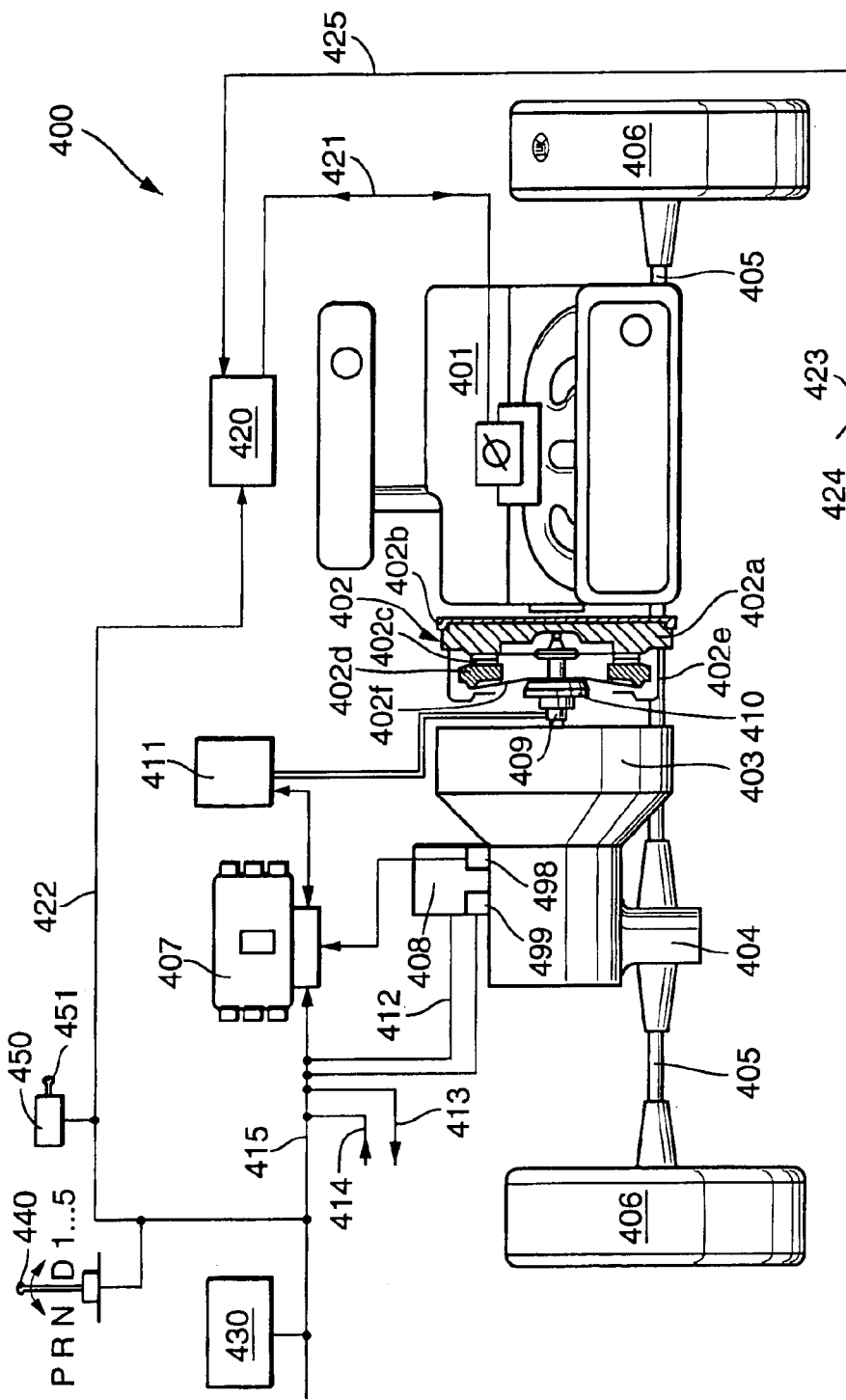
FIG. 4 represents a schematic view of a motor vehicle.

FIG. 4 represents a schematic view of a motor vehicle 400 with a power train containing a drive source such as a combustion engine 401, a torque-transmitting system 402 such as a clutch, and a transmission 403. Also shown are a differential 404, drive shafts 405, and wheels 406 that are driven by the drive shafts. There can be rpm-sensors (not shown) arranged at the wheels for detecting the wheel rpm-rates. The rpm-sensors can also be functionally associated with other electronic units such as for example an anti-lock braking system (ABS). Based on at least one wheel rpm-rate, a control unit 407 can calculate at least a traveling speed of the vehicle and/or a transmission rpm-rate.

The drive unit 401 can also be configured as a hybrid drive that may include, e.g., an electric motor, a flywheel with an overrunning clutch, and a combustion engine.

The torque-transmitting system 402 is configured as a friction clutch. Possible types of torque-transmitting systems also include a magnet powder clutch, a laminar disc clutch, or a torque converter with a converter bypass clutch, or other types of clutches. The friction clutch can also be designed as a wear-compensating self-adjusting clutch.

The transmission is in particular an automated shift transmission that is automated, i.e., operable by means of an actuating device. The actuating device includes actuators that operate at least one actuating or shifting element of the transmission to shift the gear levels or transmission ratios of the transmission. Thus, the transmission ratio can be selected automatically by means of actuators. The arrangement further includes an electronic control unit such as an electronic module for controlling the actuators. The device for the automated actuation of the transmission 403 includes a control unit 407 and an actuator 408 working under the direction of the control unit 407. The control unit 407 can likewise control an actuator 411 of the automated operation of the torque-transmitting system 402. A control unit 407 and a schematically represented actuator 408 can be seen in FIG. 4. The control unit 407 can be configured as an integrated control unit which, e.g., performs the control or regulation of the torque-transmitting system and the transmission. Furthermore, an electronic module associated with the engine can also be integrated in the control unit. However, the control of the torque-transmitting system and the transmission or, more specifically, of the actuators 407, 411 of the torque-transmitting system and the transmission, could also be performed by different control units.

It is likewise possible that the control units of the torque-transmitting system, the transmission and/or the engine are arranged separately and are communicating with each other through data lines and/or signal lines.

The control units or electronic units are further in signal communication with sensors which transmit the parameter values of the current operating status back to the control units or electronic units.

It is likewise possible that the control unit receives all required data through data lines or a data bus.

The control unit 407 is equipped with a computer unit that is capable of receiving, processing, storing, retrieving and transmitting the incoming signals and system data. The control unit further generates control data and/or signals representing operating commands for the control of actuators, as well as signals that are forwarded to other electronic units.

The torque-transmitting system 402 is mounted on or connected to a flywheel 402*a*. The flywheel can be configured as a single-mass flywheel or as a dual-mass flywheel with a primary mass and a secondary mass. A rotary oscillation damper may be arranged between the separate inertial masses, i.e., between the primary mass and the secondary mass. Furthermore, a starter ring gear 402 can be arranged on the flywheel. The clutch has a clutch disc 402*c* with friction linings and a pressure plate 402*d* as well as a clutch cover 402*e* and a diaphragm spring 402*f*. In addition, the self-adjusting clutch is equipped with means for performing an adjustment and a wear-compensation. A sensor, such as a force- or displacement sensor, monitors whether an adjustment has become necessary for example because of wear. If a wear situation is detected, the adjustment is performed automatically.

The torque-transmitting system is actuated by means of a clutch-release device 409, e.g., with a release bearing 410. The control unit 407 controls the actuator 411 which operates the clutch. The actuation of the release device can be performed through an electric motor, by a combination of electrical and hydraulic means, by hydraulic pressure, or by some other actuating mechanism. The release device 409 with a release bearing 410 can be configured as a concentric slave cylinder arranged coaxially with the transmission input shaft, which applies a force, e.g., to the tongues of the diaphragm spring of the clutch and thereby engages and disengages the clutch. However, the release device can also be configured as a mechanical release device that actuates, applies a force to, or otherwise operates a release bearing or comparable element.

The actuator 408, by way of at least one output element or actuating element, performs the gear-selecting movements and/or gear-engaging movements of the transmission. The way in which the selecting- and/or engaging movements are controlled depends on the type of transmission.

The transmission types of particular interest are those with a central actuating shaft, where the selection and engagement of a gear are performed, respectively, by an axial movement and a rotary movement of the central actuating shaft, or vice versa. An actuator may use, e.g., one actuating element to move the actuating shaft in the axial direction and another actuating element to cause a rotary movement of the actuating shaft. With an actuator of this type, the gear-engaging movement can be effected through a rotary movement and the gear-selecting movement through an axial movement, or vice versa.

Further of interest are transmissions with two actuating shafts, where one shaft serves to engage and the other serves to select a transmission ratio, with both shafts being actuated in the rotary sense to perform a gear-engaging or gear-selecting process.

Likewise of interest are transmissions with actuating rods that are moved axially to engage a gear ratio. The gear-selecting step is in this case performed by selecting which of the actuating rods is to be acted on.

The actuating shafts or actuating rods represent internal shifting elements of the transmission, or they are coupled to internal shifting elements that are moved by the shafts. The actuator 8 acts directly or indirectly on transmission-internal shifting elements for engaging, disengaging or changing the transmission ratio, where the transmission-internal shifting elements can consist of a central actuating shaft, actuating shafts or -rods, or other shifting elements.

The control unit 407 is connected to the actuator 408 through a signal connection 412, so that control signals and/or sensor signals or status signals can be exchanged, transferred or interrogated. Furthermore, there are signal connections 413 and 414 available, through which the control unit is connected at least part of the time to additional sensors or electronic units. Such additional electronic units can include, e.g., the electronics associated with the engine, the electronics of an anti-lock brake system, or of an anti-slip control system. Further sensors may include sensors that characterize or monitor the operating state of the vehicle in general, such as for example rpm-sensors of the engine or of the wheels, throttle valve position sensors, gas pedal position sensors, or other sensors. The signal connection 415 establishes a connection to a data bus such as for example a CAN bus (Central Area Network bus), through which system data of the vehicle or of other electronic units can be made available, since the electronic units as a rule are networked by way of computer units.

A gear shift or ratio change in an automated transmission can be initiated by the driver of the vehicle, for example by means of a switch, a touch key, or another transmission selector device 440 through which the driver enters a command signal for up- or down-shifting. As another possibility, it is conceivable that a signal is entered to indicate which of the gear ratios is to be engaged next. Analogously, an electronic shift lever could be used to provide a signal to indicate which gear ratio is to be engaged in the transmission.

In an alternative program mode of the transmission, an automated actuation of the transmission can be selected so that the selection of a currently active gear ratio is made dependent on the operating parameters and a gear shift is initiated automatically if necessary. It is also possible that an automated transmission shifts gears on its own at certain points that are determined based on sensor signals and by means of characteristic values, curves and data arrays without the driver having to initiate a gear change.

It is further possible to set the transmission into a neutral position N, where there is no torque-transmitting connection between the transmission input and the transmission output. It is further possible to select a parking position P in which the vehicle is immobilized by a parking lock. It is also conceivable that the parking position is selected automatically, for example when the ignition key 451 is pulled out of the ignition lock 450, provided that the parking lock is compatible with the current operating state of the vehicle. For example, if the ignition key is pulled out while the vehicle is traveling at high speed, the automated engagement of the parking lock should be blocked.

Thus, the transmission selector unit 440 can be set into a range M where the driver selects the gear ratio manually, a position D where the gear ratio is selected automatically in the traveling state of the vehicle, a position P where a parking lock is in effect, and/or a position N where the transmission is in the neutral state. It is also possible that a switch or lever is used to initiate a manual shifting mode.

The vehicle is preferably equipped with an electronic gas pedal 423 or other engine-load control lever, where the gas pedal 423 is coupled to a sensor that allows the engine electronics unit 420 to control or regulate for example the fuel supply rate, the ignition timing, injection time or throttle valve position by way of the signal line 421 of the engine 401. The electronic gas pedal 423 with the sensor 424 is connected through a signal line 425 to the engine electronics 420. The electronic module 420 is connected through the signal line 422 to the control unit 407. There can further be an electronic transmission control unit 430 in signal communication with the units 407 and 420. A throttle valve control actuated by an electric motor represents a practical solution, where the position of the throttle valve is controlled by means of the engine electronics module. With systems of this kind, it is no longer necessary or practical to use a direct mechanical connection to the gas pedal. The vehicle further has an engine start device 450 which responds to an engine start signal from the driver, e.g., an actuation of the ignition key 451 in the ignition lock, by sending commands to an electronic engine control unit and a starter device to start and/or ignite the engine.

FIG. 4 schematically illustrates a sensor 499 for detecting a position of a shifter element that is operative along the direction for selecting a gear ratio and a sensor 498 that is operative along the direction for engaging a selected gear ratio. These sensor signals are transmitted to the control unit.

The present invention further relates to a device for controlling an automated clutch where it may be sensible if the free-running function is not allowed in first gear, in order to keep all of the functions operative where the clutch needs to be engaged at least partially and/or at least part of the time, such as for example moving the vehicle at creep speed and/or the process of determining or adapting the gripping point of the clutch. By preventing the free-running function in first gear and/or in other specific gears such as reverse gear or second gear when the latter is used for starting up from a standstill, a comfortable driving behavior of the vehicle is maintained, e.g., in maneuvering the vehicle back and forth. An unnecessary amount of clutch activity can thus be avoided.

The present invention further relates to a device for controlling an automated clutch where it may be sensible if the free-running mode is made dependent on a shift program, so that the free-running function can be turned off in certain travel situations such as, e.g., driving downhill or uphill. In downhill driving it is particularly preferred if the free-running function is permitted only up to a certain grade angle or up to a certain speed or acceleration of the vehicle. In uphill driving it is advantageous if the free-running function is not permitted in some vehicle versions because it could have a negative effect on driving comfort.

The present invention further relates to a device for controlling an automated clutch where it may be sensible if a lockout on up-shifting is deactivated when the vehicle is traveling downhill in the free-running mode, or if the gas pedal depression is reduced quickly while the vehicle is traveling around a curve in the free-running mode. For example in the case of traveling downhill, a lockout of up-shifts is activated in order to take advantage of the engine brake. This causes a higher rpm-rate in the drag mode, which makes the engine brake more effective. If the transmission performed an up-shift in such a case, the vehicle would continue to accelerate because of the lower rpm-rate in the drag mode, a condition that could be undesirable. However these considerations do not apply to the free-running mode. While the free-running mode causes the vehicle to accelerate, the lockout would not allow the transmission to up-shift into a gear that is appropriate to the vehicle speed. As a result, there can be a strong deceleration when the clutch is re-engaged in connection with the exit from the free-running mode.

If a motor vehicle is equipped with a navigation system (also referred to as GPS, Global Positioning System) or with a comparable system, the topography of the terrain through which the vehicle is currently traveling can be recognized and topography-specific program parameters can be activated in the control of an automated clutch and/or an automated transmission for example when traveling uphill or downhill or along a curve, or in other special situations. The shift program can then be appropriately adapted, e.g., to the current driving situation, and a free-running mode and/or a lockout on up-shifts can be activated or deactivated.

According to a further concept of the present invention, if the free-running mode on a level road has been interrupted by tapping the gas pedal only briefly or gently, free-running is subsequently reactivated. However, for practical reasons the reactivation does not occur during uphill of downhill travel. The purpose of this feature of the invention is to increase the number of free-running phases during the time the vehicle is in motion. If the brake or gas pedal has been actuated only briefly, or if there has been no major change in travel speed as a result of a very weak actuation of the brake or gas pedal, it can make sense to use the aforementioned reactivation of the free-running mode. A brief actuation is defined in particular as an actuation of the brake or gas pedal that last less than a given time period, for example of the order of one second or a few seconds, preferably less than one or two seconds. A gentle actuation is defined for example as a pedal depression of preferably less than 10° or 15° of pedal angle.

It can be advantageous if the free-running mode is reactivated subsequent to an activation of the service brake when traveling on level terrain, if the free-running mode was active prior to the brake actuation or if the brake pressure was smaller than a defined threshold.

It can further be appropriate if the free-running mode is permitted up to a defined level of sport-oriented behavior or, alternatively, above a defined level X of sport-oriented behavior. The sportiness parameter X can be used as a measure that can be selectively set, for example from 0 to 100, representing at one end of the range a comfort-oriented programming and at the other end a sport-oriented programming of certain vehicle functions. According to this concept, if for example the sportiness level is set at 40, the program can perform an interpolation between 40% of the purely sport-oriented and 60% of the purely comfort-oriented program values. In the case where two different characteristic data arrays or characteristic curve fields are assigned, respectively, to the purely sport-oriented and purely comfort-oriented settings, the sportiness parameter X can be used to achieve the desired setting through interpolation between the two characteristic arrays or fields.

It is advantageous if different sportiness settings X are associated with different driving modes. For example, if the vehicle offers an economy mode, a sport mode, a normal mode and a winter mode, it is possible as well as advantageous to set different levels of sportiness in the different modes.

Dependent on which driving mode is selected, the free-running function can be switched on or off depending on the level of sportiness that has been assigned to a given driving mode.

The sportiness level can also be an adaptable parameter in at least one of the driving modes, where the sportiness level is varied based on a drivers actions.

For example, dependent on what level of sportiness has been set, the clutch can be engaged faster or slower when shifting gears or when taking off from a standstill. The gear change can be performed faster or slower, rpm-rates for taking off from a standstill can be selected higher or lower, or rpm-thresholds for gear shifts can be selected higher or lower.

In accordance with the invention it can be appropriate if the free-running function is permitted also in the manual shift mode of an automated shift transmission. The manual shift mode is an operating mode in which gear ratios are selected by manually actuating a selector lever. If a free-running phase is followed by a driver-initiated signal to shift gears, e.g., by tipping a selector lever to one of the positions "Tip+" or "Tip−" (up-shift or down-shift, respectively), the system responds by first engaging the selected new gear in the transmission, next by terminating the free-running function and, accordingly, by re-engaging the clutch. In another embodiment, it can be practical if the first step is to first terminate the free-running function by re-engaging the clutch and then engaging the new gear through an automated routine analogous to the manual shift mode.

In accordance with the invention, it can be advantageous if a clutch-engaging strategy after the termination of a free-running phase is dependent on a pedal actuation of the brake pedal or gas pedal. The dependency on the gas pedal actuation can additionally include a functional dependency on the angle of gas pedal depression. Based on a limit value for the pedal depression, it is further possible to distinguish between a traction phase and a drag phase, and an appropriate clutch-engaging strategy can be selected accordingly. The clutch re-engagement in a drag phase can be performed in the same manner as when down-shifting in a drag torque situation. In a traction phase, the clutch can be re-engaged in the same way as in down-shifting when the drive train is transmitting a traction torque.

In the process of determining whether the vehicle is traveling on level ground, on a downhill grade, or on an uphill grade, a distinction can be made between driving situations where the clutch is engaged and situations where it is disengaged.

If the clutch is in the disengaged position, it can be taken as an indication of a level pavement if the vehicle slows down at a given rate of deceleration and/or if the decrease in speed as a function of time lies within a given bandwidth. If the loss of speed is significantly stronger or the decrease in speed as a function of time is significantly above the given range, it can be concluded that the vehicle is traveling uphill. On the other hand, it can serve as an indication that the vehicle is traveling downhill, if the loss of speed is significantly less than the given range, or if it is zero, or if there is even an increase in speed, i.e., if the vehicle speed as a function of time shows a significantly smaller decrease or an increase.

When the clutch is in an engaged condition, the gas pedal is actuated, and a gear is engaged in the transmission, it is possible to estimate, e.g., the torque load on the engine based on the engine rpm-rate as a function of the gas pedal position and the currently active gear ratio. If the rpm-rate is within a given range, this can be taken as an indication that the vehicle is traveling on level ground. If the rpm-rate falls below the range, it can be concluded that the vehicle is traveling on an upward grade, and if the rpm-rate runs above the range, this would indicate that the vehicle is traveling on a downhill grade.

Figure 5:
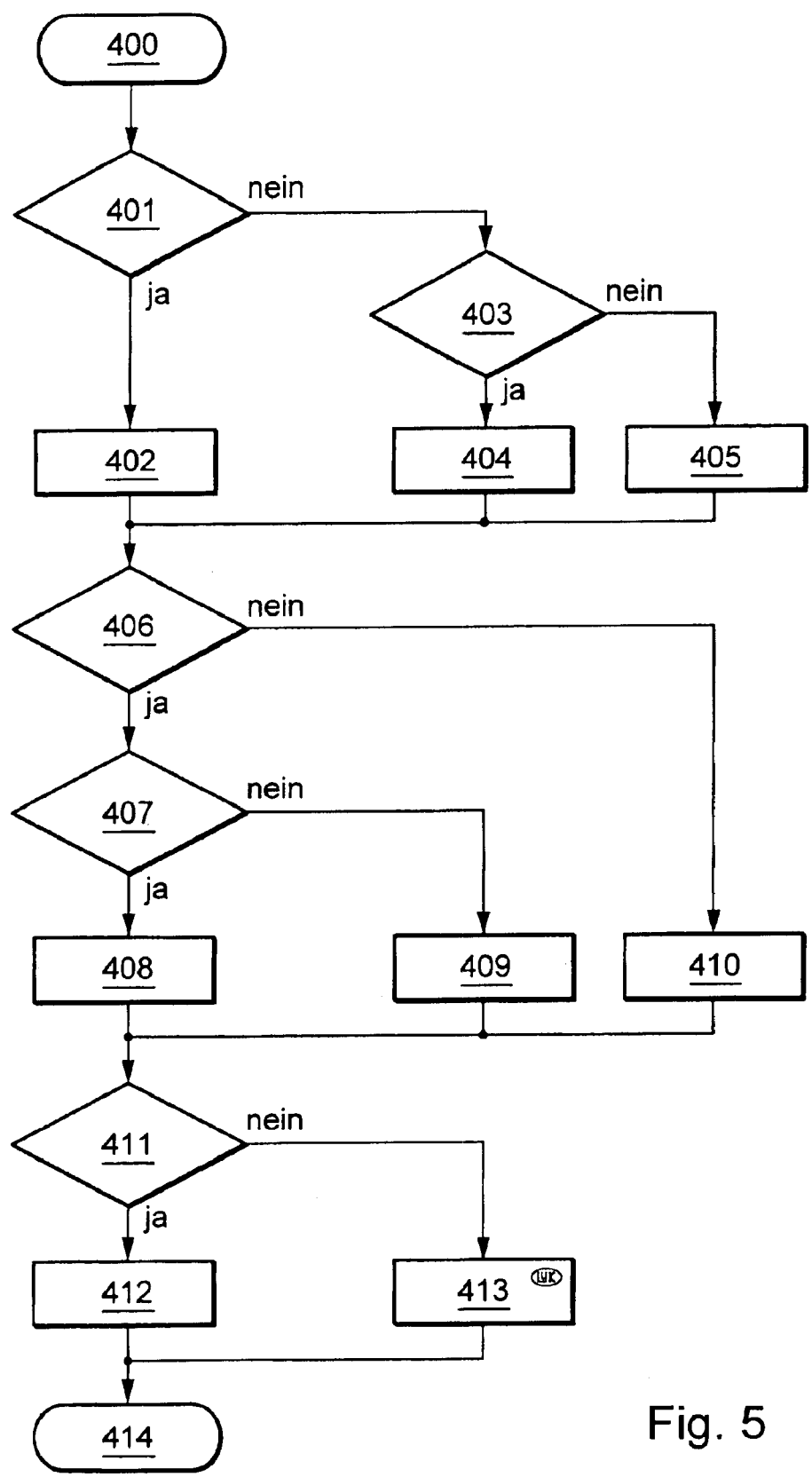
FIG. 5 represents a flowchart diagram.

FIG. 5 illustrates in a flowchart format a method according to the invention. The purpose is to explain the inventive method, and no limitation whatsoever is intended. The method is integrated in the control device as a subroutine which is called up and performed in a periodic cycle.

After entering into the subroutine in step 400, a test takes place in step 401 as to whether the gas pedal is depressed by an angle of, e.g., more than 5° and whether the service brake is in a non-applied condition. If both questions in step 401 are answered in the affirmative, the program proceeds to step 402 where a so-called history bit is set to logic 1. In the negative case of step 401, the program proceeds to step 403 representing a yes/no criterion as to whether the service brake is in an actuated state. In the affirmative case of block 403, the program flow continues to step 404 where the history bit is set to logic 0. In the negative case of block 403, the program proceeds to an empty step 405, i.e., a step in which no action occurs. From both of the steps 404 and 405, the program flow continues to the yes/no step 406 for the three simultaneous criteria whether the pedal angle is not exceeding 5°, there is no actuation of the service brake, and the history bit equals 1. In the negative case of step 406, the program proceeds to step 410 where a so-called free-running bit is set to logic 0. In the affirmative case of step 406, the program continues to step 407 representing a test as to whether the free-running program is permissible based for example on a characteristic table or characteristic curve that is stored in memory as was discussed hereinabove. If the free-running mode is permissible, the program continues to step 408 where the free-running bit is set to 1. In the negative case of step 407, the program continues at the empty step 409, where no action is taken and the free-running bit is left unchanged. From both of the steps 409 and 410, the program continues to step 411 representing an interrogation whether the free-running mode is prohibited based on the aforementioned characteristic table or curve, whether one of the gears 1 or R is engaged, or whether the car is either taking off or being tow-started in second gear. If at least one of the questions in step 411 is answered in the affirmative, the program proceeds to step 412, where the free-running bit is set to 0. In the negative case of step 411, the program continues in the empty step 413, in which no action is taken and the free-running bit stays unchanged. The result of the subroutine is represented by the logic value of the free-running bit that is present in step 414. If the free-running bit is at logic 1, the free-running mode is permitted to start, i.e., the clutch is taken out of engagement. If the free-running bit is at logic 0, the free-running mode is blocked from being started, i.e., a request to initiate the free-running mode is ignored and the clutch stays engaged.

What is claimed is:

1. A method of controlling a motor vehicle with an automated clutch, with an engine that is actuated by an engine control device, with an actuator-controlled automated transmission, and with at least one electronic control device for actuating the transmission and the clutch, the method including the steps of:

detecting a quantity that is at least representative of a traveling speed of the vehicle, detecting an actuation of at least one of a brake and a fuel-metering element, detecting an operating state of the engine, taking the clutch out of engagement if the engine is found to be running while the vehicle is found to be traveling at a speed greater than a threshold value, and if at the same time neither a brake pedal nor the fuel-metering element is found to be actuated, and subsequently re-engaging the clutch if at least one of the brake pedal and the fuel-metering element is found to be actuated, wherein prior to said re-engaging of the clutch, a transmission input rpm-rate is determined, and an engine rpm-rate is controlled in such a manner that said engine rpm-rate and said transmission input rpm-rate are brought towards a closer agreement.

2. The method of claim 1, wherein the engine rpm-rate is brought into closer agreement with the transmission input rpm-rate by setting an rpm-target for the engine control device.

3. The method of claim 2, wherein the rpm-target for the engine control device is set by the electronic control device, and wherein the engine control device brings the engine rpm-rate into closer agreement with the rpm-target by controlling a fuel flow rate to the engine.

4. The method of claim 1, wherein the engine rpm-rate is brought into closer agreement with the transmission input rpm-rate through a control intervention directed at an output torque of the engine.

5. The method of claim 4, wherein said control intervention is effected through the steps that:

the at least one electronic control device sets an engine torque control target for the engine control device, the engine control device adjusts the engine torque according to said control target, and the control target is varied over time during said adjustment in such a manner that the engine rpm-rate is brought into agreement with the transmission input rpm-rate.

6. The method of claim 1, wherein the re-engaging of the clutch takes place after the engine rpm-rate and the transmission input rpm-rate are in agreement.

7. The method of claim 1, wherein the re-engaging of the clutch is started after the engine rpm-rate and the transmission input rpm-rate are in agreement.

8. The method of claim 6, wherein the re-engaging of the clutch is performed at a maximum speed of engagement.

9. The method of claim 6, wherein said agreement is considered to be met if the engine rpm-rate and the transmission input rpm-rate are within 5% of each other.

10. The method of claim 6, wherein said agreement is considered to be met if the engine rpm-rate and the transmission input rpm-rate are within 50 rpm of each other.

11. The method of claim 6, wherein a criterion for considering said agreement to be met depends on a rate of change of the engine rpm-rate.

12. The method of claim 6, wherein said agreement is considered to be met if the engine rpm-rate equals or exceeds the transmission input rpm-rate.

13. The method of claim 4, wherein after the re-engaging of the clutch, an indicated level of engine torque at which the control intervention was performed is cut back by lowering a fuel flow rate to the engine.

14. The method of claim 1, wherein if the actuation of the brake is detected, the re-engaging of the clutch takes place before the engine rpm-rate and the transmission input rpm-rate are in agreement.

15. The method of claim 1, wherein if the actuation of the fuel-metering device is detected, the re-engaging of the clutch takes place when or after the engine rpm-rate and the transmission input rpm-rate are in agreement.

16. The method of claim 1, further including the step of: immediately beginning to re-engage the clutch if the brake pedal is found to be actuated.

17. The method of claim 1, further including the step of: while the clutch is disengaged, setting the transmission into a neutral position.

18. The method of claim 17, wherein after the transmission has been set into the neutral position, a volume-equalizing process is allowed to take place in a hydraulic circuit of the motor vehicle.

19. The method of claim 18, wherein the clutch remains engaged far a selectable time period while said volume-equalizing process is taking place.

20. The process of claim 17, wherein a current transmission ratio that is engaged prior to setting the transmission into the neutral position is stored in a memory of an electronic control unit.

21. The method of claim 20, wherein while the clutch is disengaged and the transmission is in the neutral position, the stored transmission ratio is re-engaged.

22. The method of claim 18, wherein the clutch is re-engaged after the transmission has been set into the neutral position and wherein the volume-equalizing process is performed only after a selectable time period has elapsed following said re-engagement of the clutch.

23. The method of claim 20, wherein if the motor speeds up after the clutch has been disengaged and the transmission has been set into the neutral position, a transmission ratio higher than the stored transmission ratio is set in the transmission.

* * * * *